United States Patent [19]

Grego et al.

[11] 3,751,238

[45] Aug. 7, 1973

[54] METHOD OF CHEMICALLY STRENGTHENING A SILICATE ARTICLE CONTAINING SODA

[75] Inventors: Peter Grego; Robert G. Howell, both of Corning, N.Y.

[73] Assignee: Corning Glass Works, Corning, N.Y.

[22] Filed: Feb. 25, 1970

[21] Appl. No.: 14,219

[52] U.S. Cl............ 65/30, 65/33, 65/111, 65/114, 65/116, 204/1, 117/124
[51] Int. Cl... C03c 15/00, C03c 21/00, B01d 59/40
[58] Field of Search................. 65/30, 116, 111; 204/1; 117/124

[56] References Cited
UNITED STATES PATENTS

| 3,433,611 | 3/1969 | Saunders et al. ............... 65/30 X |
| 3,628,934 | 12/1971 | Duthoit et al. .................. 65/30 X |
| 2,198,733 | 4/1940 | Leibig et al. .................... 65/3 UX |
| 3,681,041 | 8/1972 | D'Huart ........................... 65/30 |
| 3,597,179 | 8/1971 | Simmons ......................... 65/33 X |
| 2,148,630 | 2/1939 | Lillie et al. ....................... 65/116 |
| 3,287,200 | 11/1966 | Hess et al. ....................... 65/30 X |
| 3,445,316 | 5/1969 | Megles ............................. 65/30 X |
| 2,146,224 | 2/1939 | Phillips ............................. 65/116 |
| 3,524,737 | 8/1970 | Coyle et al. ..................... 65/30 |
| 3,293,016 | 12/1966 | Cornelissen ..................... 65/30 |
| 3,396,075 | 8/1968 | Morris ............................. 65/30 X |
| 3,410,673 | 11/1968 | Marusak .......................... 65/30 |

*Primary Examiner*—Frank W. Miga
*Attorney*—Clarence R. Patty, Jr., Milton M. Peterson and Clinton S. Janes, Jr.

[57] ABSTRACT

This invention relates to the treatment of a silicate glass article to develop strengthening compressive stresses within a surface layer on the article by introducing potassium ions into the glass surface layer in exchange for sodium ions. It is more particularly concerned with an improved method of treatment to increase the depth of ion exchange within the glass surface within a given time while maintaining the central tension in the article at a relatively low level.

10 Claims, No Drawings

METHOD OF CHEMICALLY STRENGTHENING A SILICATE ARTICLE CONTAINING SODA

It is well known that uniform development of compressive stresses within a surface layer on a glass article results in strengthening of the article. Various methods of producing such strengthening stresses have been proposed. Among these are two basic methods of chemical strengthening by ion exchange developed within recent years.

One of these chemical strengthening methods is commonly referred to as high temperature ion exchange, and is described in detail in U.S. Pat. No. 2,779,136. In accordance with this method, a silicate glass containing exchangeable potassium and/or sodium ions is treated at a temperature above its strain point with a source of lithium ions, for example a molten lithium salt. The lithium ions migrate into the glass in exchange for potassium or sodium ions which migrate out into the lithium salt. During this ion exchange, the glass within the ion exchanged layer undergoes molecular rearrangement to accommodate the smaller lithium ions and thereby forms a new layer of glass having a lower coefficient of expansion than the original glass. As the article cools, compressive stresses develop in the surface layer of new glass due to the difference in coefficients of expansion. In glasses of special composition, this development of compressive stresses by differential thermal expansion is greatly augmented by development of a low expansion, lithium aluminum silicate crystal phase within the surface alyer.

The other method of chemical strengthening by ion exchange is frequently referred to as a low temperature method because it must be carried out at a temperature below that at which the glass can rearrange to release stresses. Normally, this is below the glass strain point, although, in exceptional circumstances, the exchange may be at, or somewhat above, the strain point. In this method, relatively large ions, such as potassium or sodium ions, migrate into a glass in exchange for smaller sodium or lithium ions from the glass. Compressive stresses develop within the ion exchanged layer during the exchange due to the differential ionic size and resulting physical crowding within the layer. Since the glass temperature is below that at which the glass can rearrange to relieve this effect, such stresses are largely retained and contribute strengthening to the article.

An article entitled "Strengthening by Ion Exchange," at pages 215–219 of the May, 1964 issue of the *Journal of the American Ceramic Society*, describes this latter process in considerable detail. The article explains that glasses containing substantial amounts of $Al_2O_3$ and/or $ZrO_2$ are uniquely capable of having so-called abraded strength imparted thereto by this method. This means that the strengthening imparted is not substantially lost when the surface of the article is abraded in a controlled manner to simulate ordinary usage.

The low temperature ion exchange process is particularly desirable because it is capable of developing very high compressive stresses, and consequently a high degree of strengthening, in a glass article. However, use of this method has been somewhat limited by the fact that the stressed layer is normally relatively shallow. This situation can be corrected by extending the time of treatment. However, as explained in U.S. Pat. No. 3,445,316, this expedient also greatly increases the tension in the central zone of the article. In the extreme case, this results in total disintegration of an article with explosive force when breakage occurs. Such a situation is normally highly undesirable, and a variety of methods has been suggested for its alleviation.

U.S. Pats. Nos. 3,287,201 and 3,395,998 propose a combination or sequential type of ion exchange treatment in which an exchange of a small ion (lithium) for a large ion (sodium) above the glass strain point is followed by a further ion exchange in which a large ion (sodium) is exchanged for the small ion (lithium) at a temperature below the glass strain point. While this sequential treatment increases the depth of the stressed layer, it does not adequately solve the problem of explosive breakage. Furthermore, it is a relatively expensive process both because of the lithium salt required and the care necessary to avoid contamination of the second bath (sodium salt) by carry-over from the first bath (lithium salt).

U.S. Pats. Nos. 3,410,673 and 3,433,611 describe a modified form of low temperature ion exchange treatment in which, either concurrently or consecutively, sodium ions are exchanged for lithium ions and potassium ions are exchanged for both sodium and lithium ions within a glass. Again, this serves to deepen the layer but does not completely eliminate the problem of explosive breakage. Also, it involves an expensive lithia type glass as a starting material.

U.S. Pats. Nos. 3,445,316 and 3,287,200 disclose a combination or sequential type of treatment which involves an initial thermal tempering of a glass article followed by a low temperature ion exchange treatment. Such a combination treatment effectively controls the central tension and thereby minimizes the problem of explosive breakage. However, it involves two distinctly different types of strengthening operations which tends to be expensive. Also, it is difficult to successfully thermal temper thin glass articles without distortion.

Thus, the problem of securing a compressively stressed layer of substantial depth, in conjunction with a relatively high stress value at the surface or skin and a controlled central tension, has not been adequately solved. In developing chemically strengthened windows for vehicles, it was found that so-called gravel damage creates a particularly serious need for a solution to the problem. Gravel damage manifests itself as a bruise on the glass due to impact of a small stone against the glass surface. Our studies indicate that such gravel bruises cause checks normal to the glass surface which may penetrate through the compressively stressed layer into the central zone of tension if the stressed layer is shallow. In some instances, however, the check may initially only extend partially through the stressed layer but, when the article exhibits a high central tension, this check will later propagate with no further impact into the central tension zone, particularly in a moisture-containing environment, thus causing spontaneous disintegration of the window. This phenomenon has been termed delayed breakage and is especially disturbing since it occurs without warning at some time after the initiating impact has taken place.

Therefore, it has become highly desirable to develop a relatively inexpensive, but reliable, method of deepening the surface compression layer achieved in glass articles by chemical strengthening processes while limiting tension in the central tension zone to a relatively small value. Expressed alternatively, this means maintaining a relatively high ratio of depth of compressive layer to tension value. At the same time, it is desirable to provide a high compressive stress value at the surface or skin of the article. The present invention fulfills these needs and provides various other advantages as will become apparent from the following description of the invention.

The invention is a method of chemically strengthening a silicate glass article containing soda comprising introducing potassium ions into a surface layer on the glass article in exchange for a portion of the sodium ions in said surface layer by contacting the glass surface with a source of potassium ions to effect the exchange and exposing the glass to a temperature above the glass strain point for a sufficient time to permit the glass to rearrange and release stress by molecular flow, and, thereafter, contacting the glass surface with a source of potassium ions at a temperature below the glass strain point but above about 200°C. to further exchange potassium for sodium ions within the glass surface and develop compressive stresses therein. In accordance with a preferred embodiment of the invention, the glass article is heated at a temperature above the glass annealing point, subsequent to the initial ion exchange but prior to the final lower temperature ion exchange treatment, to effect an exchange of potassium ions from the ion exchanged layer with sodium ions from deeper within the article.

In practicing the invention, it is convenient to effect each ion exchange by immersing the article in a molten salt bath for the period of time required to effect the desired depth and/or degree of ion exchange. The customary potassium nitrate salt bath may be employed for the low temperature ion exchange. The same bath might also be used in the high temperature process except that the salt tends to decompose and produce an alkaline condition that is deleterious to the glass surface at the relatively high temperatures involved. Accordingly, we prefer to use a salt or salt mixture that becomes molten at about the strain point of the glass. Among these are potassium dichromate ($K_2Cr_2O_7$), a eutectic mixture of 52 percent potassium chloride (KCl) and 48 percent potassium sulfate ($K_2SO_4$), and potassium nitrate-potassium sulfate mixtures. Other potassium salts or salt mixtures which are molten within the range of 600° – 800°C., and which do not chemically attack the glass surface at such temperatures, may also be used.

The duration of the initial ion exchange treatment is of course dependent on the temperature. The temperature will normally be above the glass strain point, and preferably above the glass annealing point, but below the tmeperature at which the glass article will undergo deforming flow. In general, this temperature range is about 600° – 800°C. At the lower end of this temperature range, that is from 600° to 650°C., an optimum depth of exchange is attained in about 2 hours time. On the other hand, a time of no more than five (5) minutes may be sufficient at the upper end of the range, that is, at temperatures of 750° to 800°C., and no more than 20 minutes is usually required for optimum exchange.

It is, of course, possible to conduct this initial ion exchange at a temperature below the glass strain point and then heat the glass to a higher temperature to permit molecular rearrangement and stress release. This practice will normally not be followed because a primary benefit of the invention, rapid and deep ion exchange, is an incident of high temperature ion exchange. However, special considerations, such as use of a single salt bath, might make the procedure desirable in some instances.

Subsequent to the initial ion exchange and high temperature heat treatment, the glass article having the ion exchanged surface layer may be transferred directly to another potassium salt bath operating at a temperature below the glass strain point. While this bath may be at a temperature as low as 200° – 300°C., it is customary to maintain the bath at a temperature about 50°–100° C. below the glass strain point for optimum efficiency. In general, this temperature is in the range of 500°–525°C. At this temperature, a treatment time on the order of 4–8 hours has proven most effective. As mentioned earlier, it is customary to use a potassium nitrate ($KNO_3$) bath for this low temperature treatment, although other potassium salt baths may be employed.

If is of course not essential that a salt bath be used for either ion exchange treatment. In particular, other means of treating the glass surface with a source of potassium ions, as by a coating process or by pouring molten salt over the glass, may be employed as an alternative to immersion of the glass article in a molten bath.

Analytical studies indicate that the initial exchange of potassium and sodium ions, when the temperature is above the glass strain point, occurs at a relatively rapid rate. Thus the amount or degree of ion exchange occurring within 20 minutes at 700°C. in a glass of 575°C. strain point may correspond to that occurring over an 8-hour period at 500°C. However, no compressive stress develops during the ion exchange at 700°C. because the glass molecular structure rearranges to accommodate the larger potassium ion and thereby produces a glass of modified structure. At the completion of this initial ion exchange above the glass strain point, the surface layer on the article should normally be a glass having a mixed alkali composition, that is the alkali metal oxide component should be a mixture of potassium and sodium oxides. However, the sodium oxide ($Na_2O$) content will be lower than in the parent glass and a corresponding increase, on a molar basis, in potassium oxide will be noted.

It will be apparent that the duration of the initial ion exchange is normally limited so that a substantial $Na_2O$ content remains in the article surface. If an intermediate heating step is employed, as described later, this is less of a consideration, but even then it is preferable that the $Na_2O$ content at the glass surface not be completely depleted.

During the subsequent low temperature ion exchange, potassium ions, from the new glass layer formed in the high temperature step, migrate deeper into the glass article in exchange for sodium ions therein, thereby setting up compressive stresses to a depth of 0.010–0.015 inches within the glass. In turn, sodium ions within the surface layer exchange with potassium ions from the salt in contact with the glass. This builds up a high compressive stress in the surface of the article in combination with a relatively deep compressively stressed layer of low magnitude within the article. Thus, the desired combination of high surface strength and a relatively deep stressed layer of lower magnitude stress is attained. Further, a much lower central tension is developed by this combination than when a deep layer of high compressive stress throughout the layer is generated.

We have found that this combination is particularly effective in avoiding the breakage caused by bruise checks occurring from impact by small high energy particles such as gravel on vehicle windows. At the same time, central tension which develops within the central portion of the glass article to counterbalance the external compressive stresses, is relatively low. Hence, if breakage does occur, it does not occur with explosive force and complete disintegration of the article. It is apparent, then, that the particular times and temperatures of both ion exchange treatments will be adjusted to achieve the particular depth of stress layer and ratio of such depth to central tension that is desired for a particular product.

In accordance with a preferred embodiment of the invention, the glass article may be subjected to an atmospheric heat treatment following the initial high temperature ion exchange treatment. This optional atmospheric treatment is carried out at a temperature above the glass annealing point, that is, at a temperature where molecular rearrangement of the glass can take place, but necessarily below a temperature at which the glass article deforms. In general the treatment will be in the range of 600°–800°C. for a time varying from about 5 minutes up to an hour or so.

The primary purpose of this optional treatment is to effect an exchange of potassium ions from the new surface glass layer with sodium ions from deeper within the article. Therefore, the glass is removed from the salt bath for this treatment, but it is optional whether the surface must be freed of salt or not. In the event the glass article is cleaned and dried prior to this optional atmospheric heat treatment, the treatment is conveniently carried out in an ordinary kiln or other heating chamber in an air atmosphere. Under these circumstances a treatment time of 10–20 minutes at 700°C. has been found particularly suitable.

Alternatively, the glass article may be subjected to the optional treatment without cleaning. Conveniently, the glass is simply raised out of the salt bath into a closed chamber above the bath and heat treated while the excess salt drips from the glass. It has been found, however, that when this heat treatment is undertaken in air, alkali oxides form at the glass surface which cause chemical attack on the surface. This may be avoided by passing an acidic gas, preferably an oxide of sulfur, into the chamber during the heat treatment. Such gas reacts with the alkali to form a salt, e.g., sodium sulfate, which is not deleterious to the glass surface. In this case, we have found that a 1 hour treatment at 600°–625°C. is particularly effective.

Analyses of articles treated in this preferred manner indicate that the potassium ions in the glass surface layer migrate deeper into the glass during the atmospheric, high temperature treatment. In doing so, they replace sodium ions which migrate toward the surface of the glass. This, in turn, provides a higher concentration of sodium ions in the surface glass which may be replaced by potassium ions during the subsequent low temperature ion exchange treatment. Thus, the potential for generating a considerably higher compressive stress in the surface of the article is provided. At the same time, the exchange in depth is limited so that sufficient ions can still be exchanged subsequently to develop an adequate compressive stress at this deeper level in order to provide the desired protection against bruise check propagation.

The invention is of particular value in connection with the strengthening of alumino-, zircono-, and aluminozircono-silicate glasses. Preferably, such glasses are composed essentially of 5–25% $Na_2O$, 5–25% $Al_2O_3$ and/or $ZrO_2$, and the balance $SiO_2$ plus up to 20 percent of other compatible glass forming oxides such as MgO, $K_2O$, CaO, $P_2O_5$, $B_2O_3$, $TiO_2$, etc. The amounts of the optional oxides normally do not exceed about 10 percent each.

The invention will be further illustrated and described by reference to specific examples.

EXAMPLE I

A soda-alumina-silica glass having a composition, as calculated on the oxide basis by weight, of 61.2% $SiO_2$, 17.0% $Al_2O_3$, 12.9% $Na_2O$, 3.4% $K_2O$, 3.5% MgO, 0.4% CaO, 0.8% $TiO_2$ and 0.8% $As_2O_3$ was melted and formed into articles for processing in accordance with the present invention. A portion of the melt was rolled in the form of glass sheet having a nominal thickness of 0.085 inch. A section of this glass sheet was cut into rectangular bars 2 ½ inch in length by one-quarter inch in width. These were then ground and polished to provide rectangular glass pieces commonly known as stress bars and used for stress analysis. A further section of the glass sheet was cut into 6 inch by 6 inch squares for simulated gravel damage testing. This test consists in mounting the glass sample in a frame and dropping a one gram quartzite stone on the glass surface from increasing heights. The height at which the glass shatters is recorded as the breaking height. Finally, cylindrical canes were drawn from the melt and cut into 4 inch lengths for use in flexure breaking to provide measurements for calculation of moduli of rupture.

A set of glass samples was prepared consisting of a dozen cane samples for modulus of rupture tests, one glass square for gravel damage testing and one stress bar for stress analysis. The set was treated in a molten salt bath operating at 750°C. for a period of 20 minutes. The bath was composed of 52% KCl and 48% $K_2SO_4$ on a weight basis. The samples were then washed, dried and treated in a $KNO_3$ bath for 4 hours at 525°C. The strain point of the glass is 581°C. and the annealing point is 631°C.

The cane samples were divided in two sets of six each. One set was abraded by tumbling in contact with SiC abrasive particles, while the other set was not abraded. These samples were broken in flexure and moduli of rupture (MOR) calculated on the basis of the breaking pressures required. The average modulus for unabraded cane was 34,600 psi while the average modulus for abraded cane was 18,400 psi. Analysis of the stress bar indicated that the compressive stress layer was approximately 0.013 inch in depth and the central tension was 2.00 kg./mm.$^2$. Finally, the 6 inch square was broken in the gravel damage test at a height of 20 feet.

By way of comparison, a corresponding set of test samples, produced from the same glass and having the same dimensions, was given only the final treatment, that is a treatment of 4 hours at 525°C. in a $KNO_3$ bath. The stress bar was observed to have a compressive stress depth of about 0.006 inch with a central tension of 4.25 kg./mm.$^2$; the average MOR for unabraded cane was 80,000 psi; the average MOR for abraded cane was 55,000 psi; the breaking height in the gravel damage test was 4 feet.

EXAMPLE II

A set of stress bars and modulus of rupture cane, produced from the glass of Example I, was treated in a $K_2Cr_2O_7$ bath for a period of 2 hours at 625°C. Following this treatment, the samples were then divided into two sets with one set being treated in a $KNO_3$ bath for 4 hours at 525°C., while the other set was treated in the same bath for an additional 4 hours, that is a total of 8 hours. The samples having the 4 hour second treatment were observed to have a compressive stress depth of about 0.013 inch and a central tension of 2.00 kg./mm.$^2$. There was no appreciable increase in the depth of layer in the set of samples treated for 8 hours, but the central tension was 3.40 kg./mm.$^2$.

EXAMPLES III–VI

In a further test, several sets of test samples were prepared from the glass of Example I and subjected to the preferred method of treatment in accordance with the invention. In this treatment, each set of samples was first treated in a $K_2Cr_2O_7$ bath for a period of one hour at 625°C. Following this treatment, each set was then heated in air for 20 minutes at a temperature of 700°C. Finally, each of 4 sets was immersed in $KNO_3$ bath at 525°C. for a length of time in the range of 4–8 hours. In the following table, test measurements are given for each set of samples with the sample sets being identified by the hours of treatment in the $KNO_3$ bath. The depth of the compressive stress layer (DOL) is shown in inches, the central tension (CT) in the stress bar is shown in kg./mm.$^2$, the average modulus of rupture for a set of 6 non-abraded canes (MOR/NA) is shown in psi, and the corresponding average modulus value for a set of 6 tumble abraded samples (MOR/TA) is shown in psi. The breaking heighth is shown in feet for 6 inch squares broken in the gravel damage test as described earlier.

| Hours | DOL (in.) | CT (kg./mm.$^2$) | MOR NA (p.s.i.) | MOR TA (p.s.i.) | Gravel breaking heighth (ft.) |
|---|---|---|---|---|---|
| 4 | 0.010 | 3.50 | 74,000 | 30,400 | 10 |
| 5 | 0.010 | 3.90 | 74,700 | 38,100 | 20 |
| 6 | 0.012 | 4.30 | 77,400 | 38,500 | 20 |
| 8 | 0.012 | 4.70 | 74,600 | 43,800 | 15 |
| Samples heated only in conventional $KNO_3$-bath at 525° C. | | | | | |
| 4 | .006 | 4.25 | 80,000 | 45,000 | 4 |
| 8 | .0075 | 5.3 | 63,500 | 60,250 | 5 |
| 24 | .012 | 6..9 | 58,200 | 55,500 | 5 |

EXAMPLE VII

A further set of samples, produced from the glass of Example I, was immersed for one hour in a salt bath composed of 85% $KNO_3$ and 15% $K_2SO_4$ operating at a temperature of 610°C. The samples were removed, cleaned, and then heated in air for twenty minutes at 700°C. Following this heat treatment, the samples were immersed for a period of six hours in a $KNO_3$ bath operating at 525°C. The depth of layer was 0.011 inch; the central tension was 3.8 kgs./mm.$^2$; seven out of seven squares were unbroken at 15 feet in the gravel damage test.

EXAMPLE VIII

A set of samples, composed of a 12 inch + 12 inch + 0.070 inch sheet and a stress bar as described in Example I, was prepared from a tinted glass having the composition, as calculated on the oxide basis by weight: 63.2% $SiO_2$, 15.0% $Al_2O_3$, 13.4% $Na_2O$, 3.0% $K_2O$, 4.0% MgO, 0.5% CaO, 0.5% $Sb_2O_3$ and 0.4% FeO. This glass has an annealing point of 592°C. and a strain point of 544°C.

The samples were first treated by immersion for 1 ½ hours in the $KNO_3$—$K_2SO_4$ salt bath of Example VII at a temperature of 595°C., approximately the annealing point of the glass. Following this, they were cleaned, dried and heat treated in air for one hour at 650°C. Finally, they were again immersed in the $KNO_3$—$K_2SO_4$ bath, this time for 18 hours at 495°C., that is about 50°C. below the glass strain point.

The depth of compression layer (DOL) measured on the stress bar as 0.0093 inch, and the central tension (CT) was 4.4 kg./mm.$^2$. The glass sheet was tested in the gravel test and broke at 15 feet.

A second set of samples of the same glass, including modulus of rupture canes, was given only the conventional, low temperature ion exchange treatment. This consisted of immersion in a molten potassium salt bath for ten (10) hours at 490°C. The stress bar sample showed a depth of compression layer (DOL) of 0.004 inch and a central tension (CT) of 3.5 kg./mm.$^2$. The cane samples showed an average non-abraded MOR of 80,000 psi, while the average tumble abraded value was 50,000 psi. However, the sheet survived only four (4) feet in the gravel test.

EXAMPLE IX

A stress bar sample was prepared in accordance with Example I from a glass having the composition calculated in weight percent on the oxide basis: 58.6% $SiO_2$, 16.8% $Al_2O_3$, 12.7% $Na_2O$, 6.6% $K_2O$, 0.7% $TiO_2$, 3.5% MgO, 0.6% $As_2O_3$ and 0.5% CaO. This glass has an annealing point of 589°C. and a strain point of 544°C.

The stress bar was immersed in the $KNO_3$—$K_2SO_4$ salt bath of Example VII for one hour at 595°C. It was then cleaned, dried and heat treated in air for 20 minutes at 650°C. Thereafter, it was returned to the salt bath, this time for seven hours at 495°C. Following this treatment a depth of compression layer (DOL) of 0.010 inch and a central tension (CT) of 3.4 kg./mm.$^2$ were measured on the bar.

EXAMPLE X

A set of stress bar and modulus of rupture samples was prepared from the glass of Example I. These samples were immersed in the salt bath of Example VII for one hour at a temperature of 610°C. The samples were then raised out of, and suspended in a closed chamber above, the salt bath for a further one hour heat treatment at 610°C. During this latter treatment, sulfur dioxide was passed into the closed chamber above the salt bath to effectively provide a sulfur dioxide atmosphere about the glass. Finally the salt bath was cooled to 525°C. and the glass samples again immersed therein for a period of seven (7) hours at this temperature.

The depth of compression layer (DOL) was 0.010 inch and the central tension (CT) was 4.95 kg./mm.$^2$ as measured on the stress bar. The average MOR on non-abraded cane was 63,000 psi. while the average tumble abraded value was 46,600 psi.

EXAMPLE XI

A set of stress bar and modulus of rupture samples was prepared from an alumino-zircono-silicate glass having the calculated oxide composition on a weight basis of: 57.5% $SiO_2$, 14.2% $Al_2O_3$, 12.4% $Na_2O$, 6.1% $K_2O$, 5.5% $ZrO_2$, 0.7% $TiO_2$, 2.5% MgO, 0.7% $As_2O_3$, and 0.4% CaO. The glass has an annealing point of 620°C. and a strain point of 580°C.

The samples were first immersed in the $KNO_3$—$K_2SO_4$ bath of Example VII for one hour at a temperature of 620°C. Thereafter, the samples were washed, dried and heat treated in air for 20 minutes at 700°C. Finally, the samples were returned to the salt bath, this time for seven (7) hours with the bath at 525°C.

The depth of compression layer (DOL) was 0.011 inch on the stress bar and the central tension was 4.95 kg./mm.$^2$. The average MOR on non-abraded cane was 95,600 psi, while the tumble abraded value was 52,100 psi.

We claim:

1. A method for chemically strengthening a sodium silicate glass article which comprises:
    a. contacting the surface of said article with a source of potassium ions to cause the exchange of potassium ions for at least a portion of the sodium ions within the surface of said article to give a potassium enriched surface layer;
    b. heating said article at a temperature above the strain point but below the deformation point of the glass for at least five minutes to cause the glass molecular structure to rearrange and release stress by molecular flow so as to accommodate the large potassium ions with essentially no compressive stresses being developed in said surface layer; and, thereafter,
    c. contacting the surface of said article with a source of potassium ions at a temperature below the strain point of the glass but above about 200°C. to cause the potassium ions in said surface layer to migrate deeper into the glass article in exchange for sodium ions therein and to cause the further exchange of potassium ions for at least a portion of the sodium ions within the surface of said article and to thereby develop compressive stresses therein.

2. A method according to claim 1 wherein the first contact of the surface of said article with a source of potassium ions is carried out at a temperature above the strain point but below the deformation point of the glass for at least five minutes to thereby cause the exchange of potassium ions for sodium ions and the glass rearrangement and stress release by molecular flow to take place concurrently.

3. A method according to claim 2 wherein the first contact of the surface of said article with a source of potassium ions is carried out at a temperature between about 600°–800°C. for a time between about 5 minutes to 2 hours.

4. A method according to claim 1 wherein the first contact of the surface of said article with a source of potassium ions is carried out at a temperature below the strain point of the glass but above about 200°C. to cause the exchange of potassium ions for sodium ions and thereafter said article is heated to a temperature above the strain point but below the deformation point of the glass for at least five minutes to cause the glass rearrangement and stress release by molecular flow to take place.

5. A method according to claim 1 wherein the sodium silicate glass consists essentially, by weight, of 5–25% $Na_2O$, 5–25% $Al_2O_3$ and/or $ZrO_2$, and the balance $SiO_2$.

6. A method according to claim 1 wherein, after the first contact of the surface of said article with a source of potassium ions, said article is heated in a gaseous atmosphere at a temperature above the annealing point but below the deformation point of the glass for at least 5 minutes.

7. A method according to claim 6 wherein said article is heated at a temperature between about 600°–800°C. for a time between about 5 minutes to 1 hour.

8. A method according to claim 6 wherein said gaseous atmosphere contains an effective amount of an acidic gas to react with alkali metal oxides which form on the surface of said article during the heating thereof.

9. A method according to claim 8 wherein said acidic gas consists of an oxide of sulfur.

10. A method according to claim 1 wherein the source of potassium ions for each contact with the surface of said article consists of a bath of a molten potassium salt.

* * * * *